US008538077B2

(12) United States Patent
Zitnick, III

(10) Patent No.: US 8,538,077 B2
(45) Date of Patent: Sep. 17, 2013

(54) DETECTING AN INTEREST POINT IN AN IMAGE USING EDGES

(75) Inventor: Charles Lawrence Zitnick, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 13/099,365

(22) Filed: May 3, 2011

(65) Prior Publication Data

US 2012/0281872 A1  Nov. 8, 2012

(51) Int. Cl.
*G06K 9/00* (2006.01)
(52) U.S. Cl.
USPC .......................................... 382/103; 382/181
(58) Field of Classification Search
USPC .................................................. 382/103, 181
See application file for complete search history.

(56) References Cited

U.S. PATENT DOCUMENTS

| | | | |
|---|---|---|---|
| 5,487,115 A | 1/1996 | Surka | |
| 5,796,868 A | 8/1998 | Dutta-Choudhury | |
| 5,943,441 A | 8/1999 | Michael | |
| 6,381,366 B1 * | 4/2002 | Taycher et al. | 382/199 |
| 6,396,949 B1 * | 5/2002 | Nichani | 382/173 |
| 6,459,807 B1 * | 10/2002 | Guest et al. | 382/145 |
| 7,120,286 B2 * | 10/2006 | Yu et al. | 382/145 |
| 8,009,879 B2 * | 8/2011 | Iwai et al. | 382/118 |
| 8,265,866 B2 * | 9/2012 | Altamura et al. | 701/409 |
| 2003/0108242 A1 | 6/2003 | Conant | |
| 2007/0121094 A1 | 5/2007 | Gallagher et al. | |
| 2009/0238460 A1 | 9/2009 | Funayama et al. | |

OTHER PUBLICATIONS

Lowe, David G., "Object Recognition from Local Scale-Invariant Features", Retrieved at <<http://www.cs.ucla.edu/~soatto/vision/courses/269/papers/LoweICCV99.pdf>>, In the Proceedings of the International Conference on Computer Vision—vol. 2, Sep. 25, 1999, pp. 1-8.
Rebai, et al., "Interpretability Based Interest Points Detection", Retrieved at <<http://www-rocq.inria.fr/~boujemaa/civr07.pdf>>, In the Proceedings of the 6th ACM international conference on Image and video retrieval, 2007, pp. 8.
Tuytelaars, Tinne, "Dense Interest Points", Retrieved at <<http://ieeexplore.ieee.org/stamp/stamp.jsp?arnumber=05539911>>, In the Proceedings of IEEE Conference on Computer Vision and Pattern Recognition, Jul. 2, 2010, pp. 8.
Baumberg, et al., "Reliable Feature Matching Across Widely Separated Views", Retrieved at <<http://ieeexplore.ieee.org/stamp/stamp.jsp?tp=&arnumber=855899>>, In the Proceedings of IEEE Computer Society Conference on Computer Vision and Pattern Recognition, 2000, pp. 8.

(Continued)

*Primary Examiner* — Tom Y Lu

(57) ABSTRACT

Technology is described for detecting an interest point in an image using edges. An example method can include the operation of computing locally normalized edge magnitudes and edge orientations for the image using a processor to form a normalized gradient image. The normalized gradient image can be divided into a plurality of image orientation maps having edge orientations. Orientation dependent filtering can be applied to the image orientation maps to form response images. A further operation can be summing the response images to obtain an aggregated filter response image. Maxima can be identified in spatial position and scale in the aggregated filter response image. Maxima in the aggregated filter response image can be defined as interest points.

20 Claims, 7 Drawing Sheets

(56) References Cited

OTHER PUBLICATIONS

Bay, et al., "Surf: Speeded UP Robust Features", Retrieved at <<http://citeseerx.ist.psu.edu/viewdoc/download;jsessionid=F6C16DD74681E7773F9FE042E9DD7231?doi=10.1.1.85.2512&rep=rep1&type=pdf>>, 2006, pp. 1-14.

Brown, et al., "Invariant Features from Interest Point Groups", Retrieved at <<http://www.bmva.org/bmvc/2002/papers/92/full_92.pdf>>, 2002, pp. 253-262.

Canny, John, "A Computational Approach to Edge Detection", Retrieved at <<http://ieeexplore.ieee.org/stamp/stamp.jsp?tp=&arnumber=4767851>>, In the Proceedings of IEEE Transactions on Pattern Analysis and Machine Intelligence archive, vol. 8 Issue 6, Nov. 1986, pp. 679-698.

Fergus, et al., "Object Class Recognition by Unsupervised Scale-Invariant Learning", Retrieved at <<http://ieeexplore.ieee.org/stamp/stamp.jsp?tp=&arnumber=1211479>>, In the Proceedings of the IEEE Computer Society Conference on Computer Vision and Pattern Recognition, 2003, pp. 8.

Freeman, et al., "The Design and Use of Steerable Filters", Retrieved at <<http://ieeexplore.ieee.org/stamp/stamp.jsp?tp=&arnumber=93808>>, In the Proceedings IEEE Transactions on Pattern Analysis and Machine Intelligence. vol. 13, No. 9. Sep. 1991, pp. 891-906.

Harris, et al., "A Combined Corner and Edge Detector", Retrieved at <<http://www.bmva.org/bmvc/1988/avc-88-023.pdf>>, 1988, pp. 147-151.

Kadir, et al., "An Affine Invariant Salient Region Detector", Retrieved at <<http://people.csail.mit.edu/albert/reading/kadir-zisserman-brady_affine-invariant_eccv2004.pdf>>, 2004, pp. 1-14.

Lindeberg, Tony, "Scale-Space Theory: A Basic Tool for Analyzing Structures at Different Scales", Retrieved at <<http://www.doc.ic.ac.uk/~xh1/Referece/Scale-Space-Theory/Scale-space-theory-A-basic-tool-for-analysing-structures-at-different-scales%20.pdf>>, pp. 50.

Lindeberg, Tony, "Feature Detection with Automatic Scale Selection", Retrieved at <<http://citeseerx.ist.psu.edu/viewdoc/download;jsessionid=66659B05C6A3D45DB8DBC47D6DA103-D9?doi=10.1.1.113.6796&rep=rep1&type=pdf>>, 1998, pp. 53.

Lowe, David G., "Distinctive Image Features from Scale-Invariant Keypoints", Retrieved at <<http://www.eecs.umich.edu/~silvio/teaching/EECS598/papers/lowe.pdf>>, International Journal of Computer Vision 60(2), 2004, pp. 91-110.

Matas, et al., "Robust Wide Baseline Stereo from Maximally Stable Extremal Regions", Retrieved at <<http://cmp.felk.cvut.cz/~matas/papers/matas-bmvc02.pdf>>, 2004, pp. 384-393.

Mikolajczyk, et al., "Indexing based on Scale Invariant Interest Points", Retrieved at <<http://ieeexplore.ieee.org/stamp/stamp.jsp?tp=&arnumber=937561>>, In the Proceedings of Eighth IEEE International Conference on Computer Vision, p. 2001, 525-531.

Mikolajczyk, et al.,"An Affine Invariant Interest Point Detector", Retrieved at <<http://citeseerx.ist.psu.edu/viewdoc/download?doi=10.1.1.19.4779&rep=rep1&type=pdf>>, In the Proceedings of the 7th European Conference on Computer Vision-Part I, 2002, pp. 15.

Mikolajczyk, et al., "Scale and Affine Invariant Interest Point Detectors", Retrieved at <<http://www.robots.ox.ac.uk/~vgg/research/affine/det_eval_files/mikolajczyk_ijcv2004.pdf>>, International Journal of Computer Vision 60(1), 2004, pp. 63-86.

Mikolajczyk, et al., "A Comparison of Affine Region Detectors", Retrieved at <<http://citeseerx.ist.psu.edu/viewdoc/download?doi=10.1.1.108.595&rep=rep1&type=pdf>>, International Journal of Computer Vision, vol. 65, Issue 1-2, Nov. 2005, pp. 1-36.

Mikolajczyk, et al., "Shape Recognition with Edge-based Features", Retrieved at <<http://www.robots.ox.ac.uk/~vgg/publications/papers/mikolajczyk03a.pdf>>, In the Proceedings of the British Machine Vision Conference, 2003, pp. 10.

Nister, et al., "Scalable Recognition with a Vocabulary Tree", Retrieved at <<http://ieeexplore.ieee.org/stamp/stamp.jsp?tp=&arnumber=1641018>>, In the Proceedings of the IEEE Computer Society Conference on Computer Vision and Pattern Recognition, 2006, pp. 8.

Rosten, et al., "Machine Learning for High-Speed Corner Detection", Retrieved at <<http://citeseerx.ist.psu.edu/viewdoc/download?doi=10.1.1.60.3991&rep=rep1&type=pdf>>, 2006, pp. 1-14.

Rothganger, et al., "3D Object Modeling and Recognition Using Local Affine-Invariant Image Descriptors and Multi-View Spatial Constraints", Retrieved at <<http://citeseerx.ist.psu.edu/viewdoc/download?doi=10.1.1.117.1687&rep=rep1&type=pdf>>, International Journal of Computer Vision 66(3), 2006, pp. 231-259.

Snavely, et al., "Photo Tourism: Exploring Photo Collections in 3D", Retrieved at <<http://citeseerx.ist.psu.edu/viewdoc/download?doi=10.1.1.62.910&rep=rep1&type=pdf>>, In the Proceedings of ACM SIGGRAPH,vol. 25, Issue 3, Jul. 2006, pp. 12.

Winder, et al., "Picking the best Daisy", Retrieved at <,http://ieeexplore.ieee.org/stamp/stamp.jsp?tp=&arnumber=5206839>>, In Proceedings of IEEE Conference on Computer Vision and Pattern Recognition, Jun. 2009, pp. 178-185.

Zitnick, C. Lawrence, "Binary Coherent Edge Descriptors", Retrieved at <<http://research.microsoft.com/en-us/um/people/larryz/bice_eccv10.pdf>>, In the Proceedings of the 11th European conference on Computer vision: Part II, 2010, pp. 1-14.

* cited by examiner

DETECTING AN INTEREST POINT IN AN IMAGE USING EDGES

BACKGROUND

Identifying local features or points of interest in an electronic image is a component of many approaches for computerized object recognition, object detection, image matching, and 3D reconstruction. In these scenarios, a common approach is to use interest point detectors to estimate a reduced set of local image regions that are relatively invariant to occlusion, orientation, illumination and viewpoint changes. An interest point operator can define these regions by spatial locations, orientations, scales and possibly affine transformations. Descriptors can be computed from these image regions to find reliable image-to-image or image-to-model matches. Interest point detectors may have properties such as: (1) the interest points are repeatable, (2) the descriptors produced are individually identifiable and (3) the interest points are well-distributed spatially and across scales.

An interest point can be defined based on some function of the image, typically a series of filtering operations followed by extrema detection. Some example techniques that work based on this principle are the Harris corner detector, the Difference of Gaussian DoG (Difference of Gaussians) detector, the Laplacian detector, and their variants including Harris-Laplace and Hessian-Laplace detectors. Detectors that find affine co-variant features have also been proposed such as Harris-affine, Hessian-affine, Maximally Stable Extremal Regions (MSER) and salient regions. Most of these approaches perform a series of linear filtering operations on the image's intensities to detect interest point positions. However, filtering intensities directly can result in reduced repeatability for finding interest points in an image under non-linear lighting variations that commonly occur in real world scenarios. Furthermore, when detecting objects in a scene, changes in the background can also result in non-linear intensity variations along object boundaries, resulting in a similar reduction in repeatability for finding interest points in an image.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various examples can be described for detecting an interest point in an image using edges. The method can include the operation of computing normalized edge magnitudes and edge orientations for the image using a processor to form a normalized gradient image. The normalized gradient image can be divided into a plurality of image orientation maps having edge orientations. Orientation dependent filtering can be applied to the image orientation maps to form response images. A further operation can be summing the response images to obtain an aggregated filter response image. Maxima can be identified in spatial position and scale in the aggregated filter response image. Maxima in the aggregated filter response image can be defined as interest points.

An example system can detect an interest point in an image using edges. The system can include a memory device for storing the image. A normalization module can compute locally normalized edge magnitudes and orientations for the image using a processor to form a normalized gradient image. A plurality of image orientation bins can be provided to represent line orientations into which the normalized gradient image can be divided to create image orientation maps. An orientation dependent filtering module can apply orientation dependent filters to the image orientation maps to form response images using a processor. A summation module can sum the response images in order to obtain an aggregated filter response image. In addition, an interest point identification module to identify local maxima in the aggregated filter response image in spatial position.

DETAILED DESCRIPTION

Figure 1A:
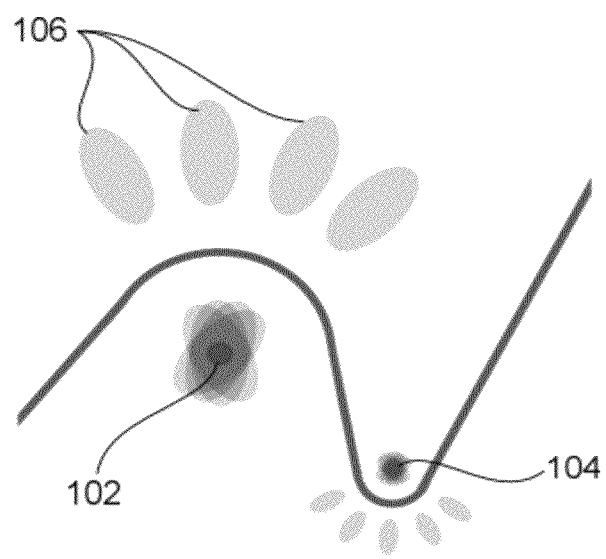
FIG. 1A is an image illustrating an example of a set of edge focus points or edge foci that can be defined as the set of points that lie roughly equidistant to a set of edges with orientations perpendicular to the point.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Interest point detectors can be categorized based on the transformations for which they are co-variant. Early interest point detectors were corner detectors that detected the positions of corner-like features in the image. Scale co-variant features were later introduced using Laplacian or Difference of Gaussian filters. More recently, several interest point detectors have been proposed that are co-variant with affine transformations, including detectors that detect stable regions of intensity and salient regions. Combinations of either Harris or Hessian corner detectors, followed by Laplacian scale selection and affine fitting have also been proposed. Computationally efficient detectors have also been proposed, including SURF (Speeded Up Robust Features) and FAST (Features from Accelerated Segment Test).

The technology described here can include a method to repeatedly detect interest points in position and scale across images. Interest points are points or areas in an image that can be repeatably identified and have a well-defined definition in an image space or a plurality of images for a scene. Interest points are desired to have information content that simplifies image processing and are desired to be stable or repeatedly identifiable. Scale can also be an attribute of interest points. Interest points may be used to find correspondences between images for object recognition, location recognition, and duplicate image matching.

An interest point detector using this technology can use edges to find edge foci. Edge foci can be points or areas in an image that are roughly equidistant from edges with orientations perpendicular to the point or area. The scale of the interest point or area can be defined by a distance between the edge foci and the edges.

In order to detect interest points using edge foci, the set of edge focus points or edge foci can be defined as the set of points that lie roughly equidistant to a set of edges with orientations perpendicular to the point, shown as center dots 102, 104 in FIG. 1A. The detection of edge foci can be computed from normalized edge magnitudes, and the detection of edge foci may be directed to features other than the image's intensities or absolute gradient magnitudes. In contrast to image intensities, the presence of edges and edge orientations is believed to be more robust to non-linear lighting variations and background clutter. Edge foci can be detected by applying various filters perpendicular and parallel to an edge.

Figure 1B:
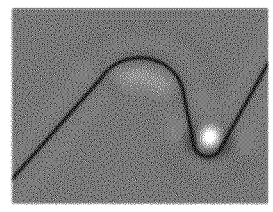
FIG. 1B illustrates an example of peak aggregated filter responses on a small scale.
Figure 1C:
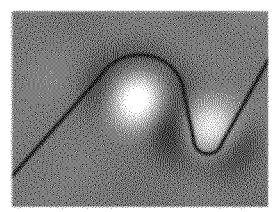
FIG. 1C illustrates an example of peak aggregated filter responses on a large scale.

A filter can be applied parallel to the edge to determine the edge's scale using a Laplacian of a Gaussian filter. The second filter can blur the response perpendicular to the edge centered on the predicted positions of the foci, shown as grey ellipses 106 in FIG. 1A. Aggregating the responses from multiple edges results in peaks at edge foci 102, 104. FIGS. 1B and 1C show examples of two detected foci at different scales.

The technology of the detector may have three stages. One stage can compute locally normalized edge magnitudes and orientations. In addition, orientation dependent filtering can be applied on the resulting edges and the results of the orientation dependent filtering can be aggregated. Local maxima can be found in the resulting aggregated filter responses in both spatial position and scale. Using these stages may result in increased repeatability of the detector and uniqueness of the resulting descriptors even under challenging lighting variations and background clutter.

Figure 2:
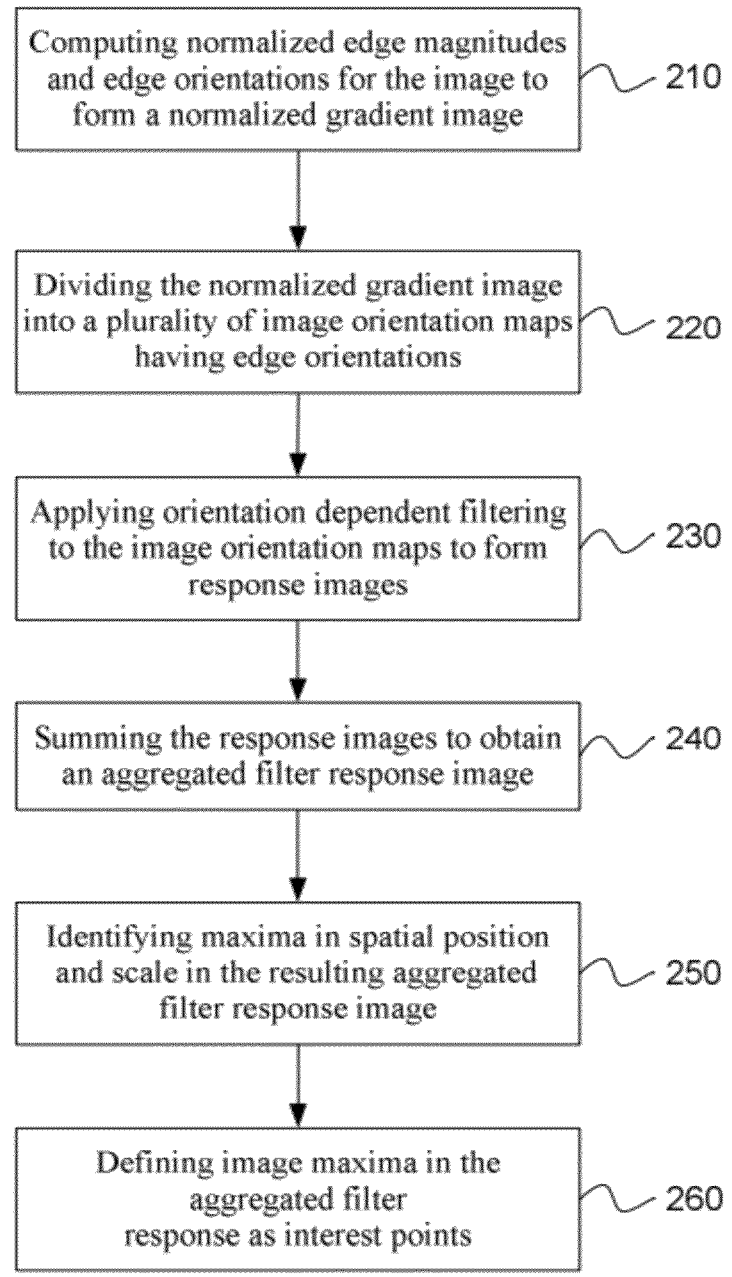
FIG. 2 is an example of a flowchart illustrating a method for detecting an interest point in an image using edges.

A high level description of the technology will be described with respect to FIG. 2 and then a more specific example of the technology will be described next. An example method for detecting an interest point in an image using edges is illustrated by FIG. 2. The method can include the operation of computing locally normalized edge magnitudes and edge orientations for the image using a processor to form a normalized gradient image, as in block 210. The normalized gradient image can be formed or computed by normalizing edge magnitude and computing the average gradient in local spatial neighborhoods for pixels in the image. In other words, normalized edges are found by taking an image and computing the gradient magnitudes for each edge (or pixel) in the image. Then within a local window in the image, a computed gradient is divided by the average gradient of the edges in the window to normalize the gradient magnitudes.

The normalized gradient image can be divided into a plurality of image orientation maps having edge orientations, as in block 220. The image orientation maps can be created by dividing edge magnitude of pixels into separate image orientation maps based on a gradient orientation of pixels. For example, the normalized gradient image may be divided into a set of 8 images with 8 different orientations. Each image orientation map can be assigned an orientation degree over the 180 degrees of unrepeated orientations (e.g., 0 degrees, 22.5 degrees, 45 degrees, etc.) The edge magnitudes can be separated between image orientation maps using a linear interpolation between at least two image orientation maps with a relevant orientation for the pixel's or edge's orientation. In other words, the gradient for each pixel can be computed and then the pixel magnitude can be divided by fractions into the bins by linearly interpolating and dividing the pixel magnitude between the two bins based on the bins orientation (as represented in degrees) as compared to the pixel's orientation. This allows the technology to create a histogram using the orientation of the gradient.

Figure 5A:
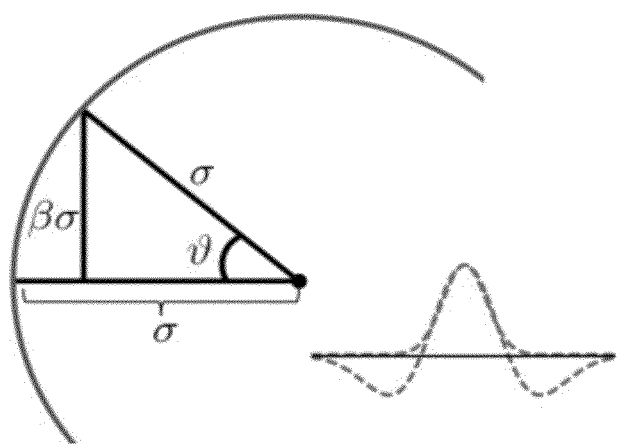
FIG. 5A illustrates an example of the computation of an overlapping Gaussian with Laplacian filter.
Figure 5B:
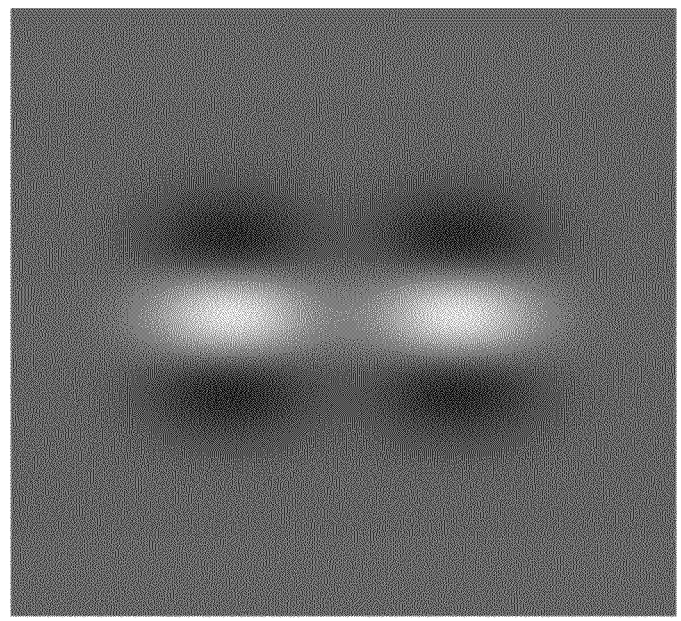
FIG. 5B illustrates of example of the filter response G that can be applied to normalized edge images.

Orientation dependent filtering can be applied to the image orientation maps to form response images, as in block 230. The orientation dependent filters can correspond to orientations of image orientation maps derived from the normalized gradient image. A Laplacian filter can be applied parallel to a normalized edge to determine the normalized edge's scale. Further, a series of Gaussian filters can be applied to edges of predicted positions of edge foci on a side perpendicular to the edges. Referring also to FIG. 5B, the filter can be the Laplacian of the Gaussian in the vertical direction in the figure and the filter can use two Gaussian filters in the horizontal direction. The filters can be applied to the orientation maps at an orientation that corresponds to the orientation of the edges in an image orientation map to which the filter is being applied. This application of the filter results in the oriented response images or filter response maps.

The response images can be summed to obtain an aggregated filter response image, as in block 240. This allows the Gaussian filter to be applied perpendicular to the edges to reinforce the filter response for edge foci. In an example, the Gaussian filter can be a summation of two Gaussian filters centered at $-\sigma$ and $\sigma$ from the edge.

In this discussion, when filters are described as being applied as parallel or perpendicular to an edge, these filters may be applied in ways that are not strictly parallel or perpendicular but which provide the same desired filter results. For example, a filter that may otherwise be applied parallel or perpendicular to an edge may also be applied at a small angle off of the parallel or perpendicular angle, if the desired filter results are still useful.

In one example configuration, the orientation dependent filtering can be applied using a series of linearly separable filters. Orientation dependent filtering can be applied to the image orientation maps at multiple scales and aggregating filter responses at multiple scales can provide interest points at multiple scales.

Maxima can be identified in spatial position and scale in the resulting aggregated filter response image, as in block 250. Maxima can be found by identifying an intensity peak or pixels with an intensity above a defined threshold. The maxima can be identified in proximity to edge foci to detect interest points based on the aggregated filter responses near the edge foci. Image maxima in the aggregated filter response can be defined as interest points, as in block 260. A pixel in the image may be considered a local maxima if the pixel's intensity response is higher than a response threshold compared to pixel neighbors in a 3×3×3 neighborhood, as identified using a 3D (three dimensional) quadratic function.

Interest points can also be identified at different levels of scale using this technology. Using different scales allows the detector to get an interest point that is similar in relative size to the image portions between the images being compared. Image patches that are compared from two images with interest points of similar size can increase the possibility of matches between the interest points in different images. The multiple scales under which interest points are detected can include the original image scale and then the scale can shrink by a logarithmic amount. For example, the scale may decrease by the cube root of 3 at each decreasing level of scale. Computing interest points from images edges can make the interest point detector more invariant to lighting changes, cast shadows, and other image variations.

FIG. 1A illustrates of the position of edge foci relative to edges shown by the curved line. Ellipses show the area of positive response for the orientation dependent filters. Peak aggregated filter responses are depicted for a small scale interest point (FIG. 1B) and large scale interest point (FIG. 1C).

Further details regarding the technology can now be described for interest point detection, as illustrated in part by FIG. 3. The computation of normalized edges and orientations 312 will be described initially, followed by orientation dependent filtering (314 and 315). In addition, approaches to computing the filter responses across scales, and the detection of maxima in scale space will be discussed.

Initially, this discussion will cover finding interest points at a particular scale $\sigma$ in image I. The scale $\sigma$ can define the size of the local structures to be detected or the distance between the edges and their respective foci as seen in FIG. 1.

Using Gaussian pyramid based techniques, the image can be blurred using a Gaussian kernel with a standard deviation of $\alpha\sigma$ to set the detector to be covariant with scale. As an example, $\alpha=0.25$ for some situations. The $\alpha$ used can be large enough to remove quantization noise when computing orientations at smaller scales, while not being too large that the a blurs out image structures. The intensity of a pixel p in the blurred image $I^\circ$ at location $(x_p, y_p)$ is denoted $I^\circ(p)$ or $I^\circ(x_p, y_p)$. The horizontal gradient $I_x^\circ(p)$ of the pixel is equal to $I^\circ(x_p+1, y_p)-I^\circ(x_p-1, y_p)$ and similarly for the vertical gradient $I_x^\circ(p)$. The magnitude of the gradient for pixel p is the Euclidean norm of its gradients, $(p)=\|[I_x^\circ(p) I_y^\circ(p)]^T\|_2$. The orientation can be defined as $\theta(p)=\arctan(I_y^\circ(p)/I_x^\circ(p))$. In addition, the orientations are not polarized, i.e. $\theta(p) \in [0, \pi]$.

If the original image already exhibits some spatial blurring with a standard deviation of $\sigma_0$, amount of blur may be reduced to $\sqrt{(\alpha\sigma)^2-\sigma_0^2}$ a to ensure a resulting blur with a standard deviation of $\alpha\sigma$. In some example situations, an initial blur of $\sigma_0=0.5$ can be used, since most real images exhibit some fractional pixel blur.

In order to normalize the edge magnitude, the average gradient in a local spatial neighborhood of each pixel can be computed. The average Gaussian weighted gradient $\bar{f}(p)$ in a neighborhood N of p can be:

$$\bar{f}(p)=\Sigma_{q\in N}f(q)G(q-p,\alpha\sigma\sqrt{(\lambda^2-1)}) \quad \text{(Equation 1)}$$

where $G(x, s)$ is a normalized Gaussian evaluated at x with zero mean and a standard deviation of s. In one example, $\lambda=1.5$. Next, the average Gaussian weighted gradient can be divided by the mean gradient $\bar{f}$ to compute a normalized gradient $\hat{f}$:

$$\hat{f}(p) = \frac{f(p)}{\max(\bar{f}(p), \epsilon/\sigma)} \quad \text{(Equation 2)}$$

where $\epsilon=10$ is used to ensure the magnitude of $\hat{f}(p)$ is above the level of noise. An example of the normalized gradients 312 is shown in FIG. 3.

Orientation dependent filtering can then be applied. A series of linear filters on the normalized gradients $\hat{f}$ 314 can be computed based on the filter's orientations $\theta_p$ 315, as illustrated in FIG. 3 (314, 316). A number of different filters can be applied perpendicular and parallel to the edges. As shown in FIG. 5B, a Laplacian filter can be applied parallel to an edge to determine the edge's scale or length. Gaussian filters can be applied at predicted positions of edge foci on either side perpendicular to the edge. As a result, edges that are equidistant and perpendicular to edge foci can reinforce each others' responses. The responses 316 of the edges can be summed together to get a filter response 318 (FIG. 3). Finally in interest point can be identified in the original image 320 as shown by the circle on the motorcycle tire.

Figure 4A:
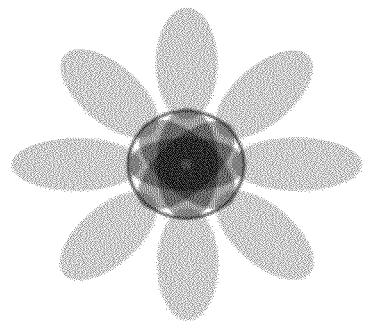
FIGS. 4A-C illustrate examples of grey ellipses representing areas of positive response for a filter at different size values for the filter.
Figure 4B:
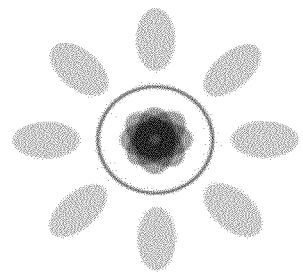
Figure 4C:
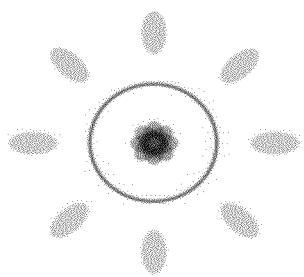

The filter applied parallel to edges can be used to determine or estimate the scale of the edges, i.e. the linear length of each edge segment. A filter known for detection of scale is the Laplacian of Gaussian filter. This filter can produce a maximal response at a correct scale without producing extraneous or false peaks. A one dimensional (1D) filter can be defined as:

$$u(x,\sigma)=-\sigma_u^2 \nabla^2 G(x,\sigma_u) \quad \text{(Equation 3)}$$

where $\sigma_u=\sqrt{(\beta\sigma)^2-(\alpha\sigma)^2}$ to account for the blurring already applied to the image. Scaling by a factor of $\sigma_u^2$ can provide scale co-variance. Varying the value of $\beta$ can affect the size of the area around the edge foci that is reinforced by the individual edge responses, as shown in FIGS. 4A, 4B, 4C. A value too large, as in FIG. 4A, may blur structural detail, while a value too small may suffer from aliasing artifacts and create multiple peaks if the edges are not exactly aligned perpendicular to the foci, FIG. 4C. An intermediate value of $\beta=0.5$ can be chosen that is robust to noise but does not blur detail, as in FIG. 4B. In other words, Equations 3 and 4 compute the height and width of the filter.

The filter applied perpendicular to the edge allows edges of similar lengths to reinforce the other edge's responses at potential edge foci, as shown in FIG. 1A. Edge foci may be assumed to exist at a distance of 6 perpendicular to the edge. As a result, the filter can be the summation of two Gaussians centered at $-\sigma$ and $\sigma$:

$$v(x,\sigma)=G(x-\sigma,\sigma_v)+G(x+\sigma,\sigma_v). \quad \text{(Equation 4)}$$

The value of $\sigma_v$ may be assigned based on the predicted variance of the edge foci. However, setting $\sigma_v=\sqrt{(\beta\sigma)^2-(\alpha\sigma)^2}$ the same value as $\sigma_u$ provides computational advantages. The two dimensional (2D) filter resulting from convolving Equations 3 and 4 can be computed using steerable filters that are linearly separable, as discussed in detail later.

Instead of computing a filter response based on each edge's orientation independently, the set of normalized edge magnitudes $\hat{f}$ can be distributed onto a discrete number of edge orientation images $\hat{f}_i$, where $i \in N_\theta$, ($N_\theta=8$) to reduce the computational complexity. Edges can softly be assigned to an edge orientation image $\hat{f}_i$ using:

$$\hat{f}_i(p)=\hat{f}(p)G(\theta(p)-\theta_i,\theta) \quad \text{(Equation 5)}$$

where $\theta=\sin^{-1}(\beta)/2$, and $\theta_i=i\pi/N_\theta$. As illustrated in FIG. 5D, the Laplacian filter can have a zero crossing at $\beta\sigma$, and the edge focus point can be a distance σ from the edge. For an object with locally constant non-zero curvature, a value of $\sin^{-1}(\beta)/2$ can be assigned to θ to match the widths of the Gaussian in Equation 5 to the center of the Laplacian in Equation 3, i.e. the standard deviation of the Gaussian can be half the Laplacian, as seen in the inset of FIG. 5A.

The edge orientation images $\hat{f}_i$ can be computed using steerable filters. However, steerable filters have a wide response across orientations, which can lead to reduced repeatability of the detector.

Figure 3:
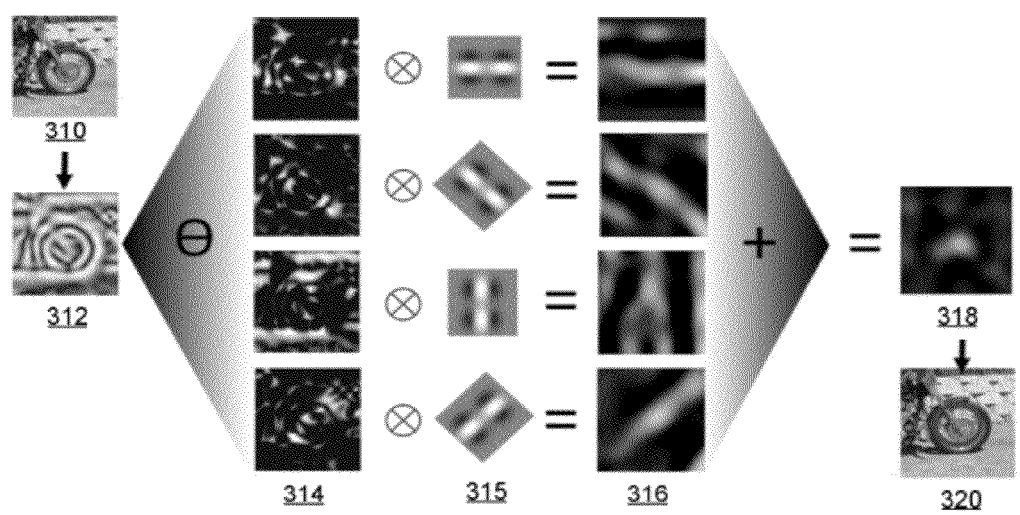
FIG. 3 is a flowchart illustrating an example flow diagram for processing applied to images in an interest point detector.

As shown in FIGS. 3 and 5B, if $g_i$ is a 2D filter found by convolving a vertical filter (Equation 3) and horizontal filter (Equation 4) rotated by $\theta_i$, a response function h can be computed using:

$$h = \frac{1}{N_\theta} \sum_i h_i \qquad \text{(Equation 6)}$$

where $h_i = \hat{f}_i \otimes g_i$.

The use of steerable filters in this technology will now be discussed further. A description can be provided of how $h_i = \hat{f}_i \otimes g_i$ is computed for each i. Naively convolving $\hat{f}_i$ with the 2D filter $g_i$ can be computationally expensive. Since the filter (Equation 4) may be the summation of two identical Gaussians, a single Gaussian blur can be applied and the result at two different offsets can be summed:

$$h_i(p) = \tilde{h}_i(p-p') + \tilde{h}_i(p+p') \qquad \text{(Equation 7)}$$

where $p' = \{\sigma \cos(\theta_i), \sigma \sin(\theta_i)\}$ and $h_i = \hat{f}_i \otimes G_2^i$. $G_2^i$ is the second derivative edge filter with orientation $\theta_i$ resulting from the convolution of a Gaussian and its second derivative. If $\sigma_u = \sigma_v$, $G_2^i$ combined with Equation 7 results in the same response as applying the filters (i.e., Equation 3 and Equation 4). It is known that $G_2^i$ can be computed as a set of three 2D filters that are linearly separable:

$$G_{2a}(x,y) = \sigma_u^2 G(y,\sigma_u) \nabla^2 G(x,\sigma_u) \qquad \text{(Equation 8)}$$

$$G_{2b}(x,y) = \sigma_u^2 \nabla G(x,\sigma_u) \nabla G(y,\sigma_u) \qquad \text{(Equation 9)}$$

$$G_{2c}(x,y) = \sigma_u^2 G(x,\sigma_u) \nabla^2 G(y,\sigma_u) \qquad \text{(Equation 10)}$$

Using Equations 8, 9 and 10, the $G_2^i = k_a(\theta_i) G_{2a} + k_b(\sigma_i) G_{2b} + k_c(\theta_i) G_{2c}$ can be computed with:

$$k_a(\theta_i) = \cos^2(-\theta_i + \pi/2)$$

$$k_b(\theta_i) = -2 \sin(\theta_i) \cos(-\theta_i + \pi/2) \qquad \text{(Equations 11)}$$

$$k_c(\theta_i) = \sin^2(-\theta_i + \pi/2)$$

In practice $G_2^i$ may also be computed by first rotating the image by $-\theta_i$, applying $G_2^0$ and rotating back. However, artifacts due to re-sampling may reduce the quality of the response. The computational power used is similar for both techniques.

The computations for scale space can now be described. Previously, the filter response function $h^k$ at the scale σk was described, where k ∈ K is the set of computed scales. There are several methods that may be used for computing interest points across multiple scales depending on how image resampling is performed. For instance, a naive approach can apply increasing values of σ to the original image to compute each scale. However at large values of σ, computing the filter responses can be expensive.

One approach is to use an octave pyramid in which the image size is constant in an octave of scale space and resized by half between octaves. An octave refers to a doubling in size of σ. This approach reduces artifacts resulting from resampling, while being computationally efficient due to the reduced image size at larger scales. In approaches based on Gaussian filters such as the DoG (Difference of Gaussians) interest point detector, each level of the pyramid can be progressively blurred for increased efficiency. Since non-linear operations are performed on the image, such as computing orientations and normalizing gradients, the response of one scale cannot be progressively blurred to find the next scale. Instead, at scale k recompute $\hat{f}$ and $\theta_p$ to produce $h^k$. For example, three levels per octave can be computed, i.e. $\sigma^{k+1}/\sigma^k = 2^{1/3}$. Two additional padding scales may be computed per level to aid in peak detection.

Maxima detection can then take place. Given a set of response functions $h^k$ over scales k ∈ K a set of individually identifiable and stable interest point detections is desired to be identified. For example, a pixel p is said to be a peak if the pixel's response is higher than the pixel's neighbors in a 3×3×3 neighborhood, i.e. its 9 neighbors in $h^{k-1}$ and $h^{k+1}$, and the pixel's 8 neighbors in $h^k$. In addition to being a maxima, the response can also be higher than a threshold τ=0.2.

The interest point locations can be refined by fitting a 3D quadratic function to the local response $h^k$ in the same 3×3×3 neighborhood. The computed offset $\hat{x}$ from the original position x can be found using:

$$\hat{x} = -\frac{\partial^2 h^{-1}}{\partial x^2} \frac{\partial h}{\partial x} \qquad \text{(Equation 12)}$$

Figure 6A:
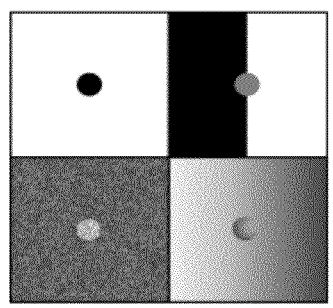
FIG. 6A illustrates a test image for testing filter response.
Figure 6B:
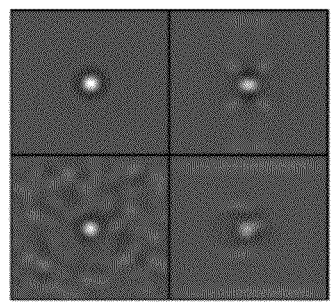
FIG. 6B illustrates an example filter response for an edge foci detector on the image of 6A.
Figure 6C:
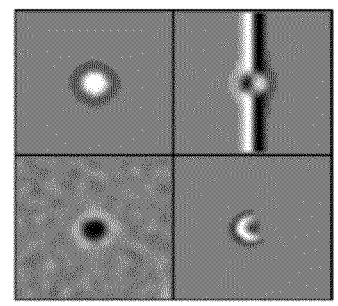
FIG. 6C illustrates an example filter response for a Laplacian detector on the image of 6A.

A response of the detector in this technology can be provided in comparison with the Laplace detector on a set of examples to provide additional insight. FIG. 6B shows the filter responses of this detector technology and the Laplacian detector FIG. 6C as applied on a set of four examples FIG. 6A for a fixed scale. The filter responses are more consistent for the edge based detector as compared to the intensity based Laplacian detector. The edge foci detector finds interest points at the correct scale and position on the four circles, where the Laplacian fails on the right two.

For many applications such as image matching and 3D reconstruction, it is desired that local features detected in the image are well-distributed spatially and across scales. This is useful for both detecting objects occupying a small area of the image and to remove the redundancy of overlapping interest points at neighboring scales. Edge foci interest points have higher entropy indicating a distribution across spatial locations and scales. In addition, edge foci interest points have a greater spatial distribution than the other interest point detectors that tend to cluster detections.

Repeatability represents the interest points that are detected at the same relative positions and scales across images. Across various images, the edge foci detectors perform well, especially in those images containing significant lighting variation. In contrast, Maximally Stable Extremal Regions (MSER) can perform well on severe affine transformations (Graffiti). Hessian Laplace and Harris Laplace are generally within the top ranks of performers, but Harris and Hessian typically perform worse due to poor scale localization.

While the repeatability measure describes how often the same regions can be matched in two images, repeatability does not measure the uniqueness of the interest point descriptors. Individually identifiable descriptors help avoid false matches, especially in applications with large databases. As stated before, redundant interest points across scales may create similar descriptors. Interest points that are just detected on very specific image features may also reduce the distinctiveness of descriptors. Typically the detectors have a tradeoff between uniqueness and repeatability. A detector that finds specific image structures may be very repeatable, but the corresponding features will not be as individually identifiable. As a result, detectors need to be designed to perform well on both measures. For instance, Harris Laplace and Hessian Laplace are more repeatable but not as individually identifiable, where DoG provides more individually identifiable points that are not as repeatable. Edge foci detectors maintain a balance between these tradeoffs.

Orientation dependent filtering is useful for localizing interest points using edge information. If a standard spatial filter such as a Laplacian is used directly on the edge responses, numerous false peaks and ridges can occur. Due to the peakiness of this edge foci filter, filtering of local maxima based on the ratio of principle curvatures may be unnecessary. The filter responses can also be used for affine fitting.

Due to the non-linear operations performed by this filter with orientation dependent filtering, this detector may be more computationally expensive than previous approaches. However, the filters applied to the images can be mapped to a GPU (Graphics Processing Unit). The filters applied to the oriented normalized edge images may also be computed in parallel. Furthermore, this technology for detecting interest points can use edge foci where the positions of the edge foci are computed using normalized edges and are more invariant to non-linear lighting changes and background clutter.

Figure 7:
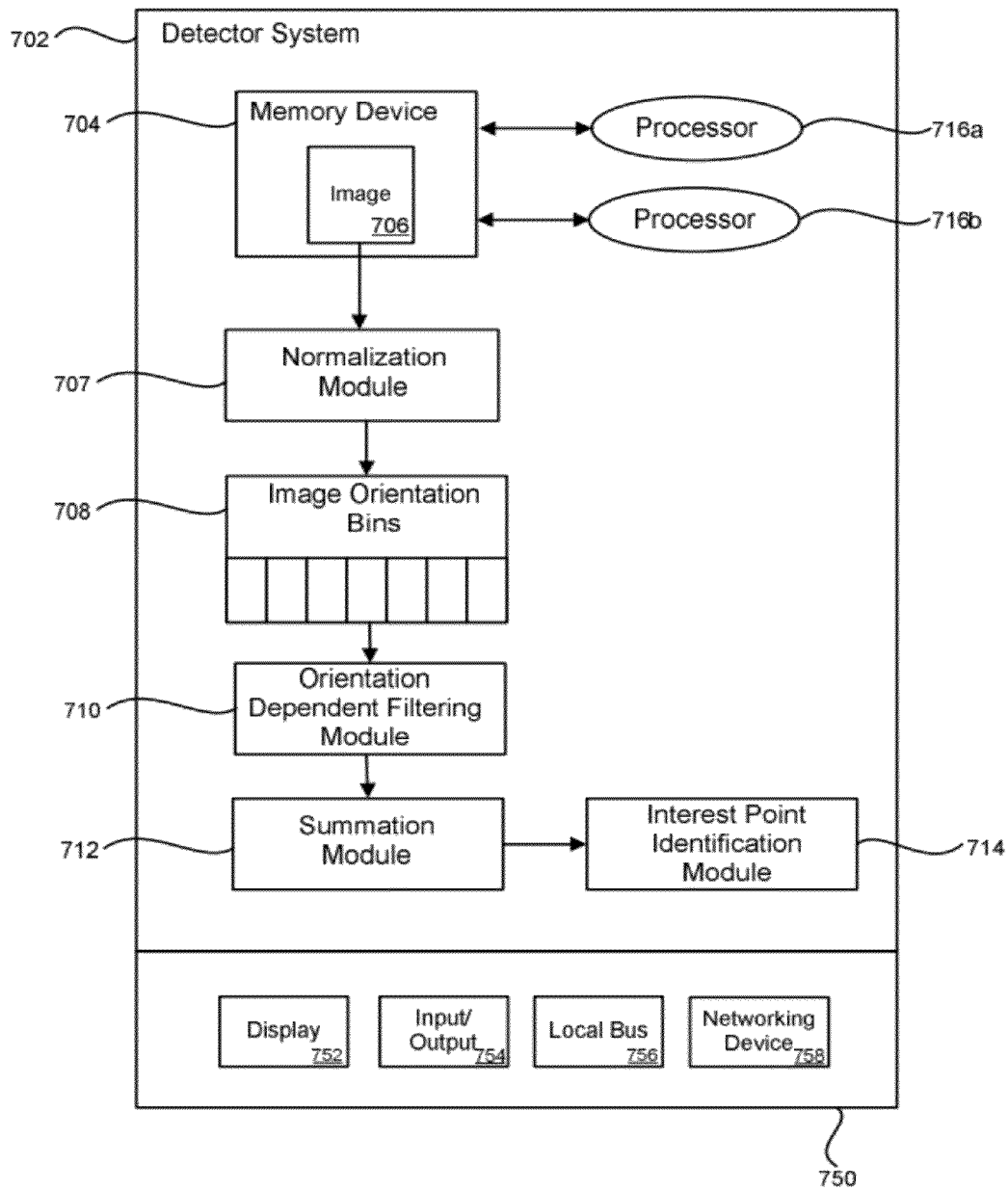
FIG. 7 illustrates a system for detecting an interest point in an image using edges.

FIG. 7 illustrates a detector system 702 for detecting an interest point in an image using edges. The system can include a memory device 704 for storing the image 706. A normalization module 707 can be provided to compute locally normalized edge magnitudes and orientations for the image using a processor 716a to form a normalized gradient image.

The system can include a plurality of image orientation bins 708 representing edge orientations into which the normalized gradient image can be divided to create image orientation maps. An orientation dependent filtering module 710 can apply orientation dependent filters to the image orientation maps to form response images using a processor. The orientation dependent filters can be applied to the orientation image maps using parallel processing units 716a, 716b.

A summation module 712 can sum the response images in order to obtain an aggregated filter response image. In addition, an interest point identification module 714 can identify local maxima in the aggregated filter response image in spatial position. The interest point identification module can also be configured to apply orientation dependent filtering to image orientation maps at multiple scales and to aggregate the responses at multiple scales to identify interest points at multiple scales.

The detector system 702 may include additional computing components 750 with a hardware display 752, an input/output module 754 that may include a keyboard or a pointer type of input device, a local communication bus 756 to enable communication between hardware devices, modules, and components in the detector system, and a networking device 758 for communication across a network with other compute nodes, processes on other compute nodes, a storage cloud, or computing devices in other locations or on other networks.

This technology provides an interest point detector based on analyzing edges and edge foci using normalized edges with orientations. Using edges and edge orientations is more robust to non-linear lighting variations and background clutter than purely intensity based techniques. Specifically, edge foci can be detected as points in the image that are roughly equidistant from edges with orientations perpendicular to the point. The scale of the interest point can be defined by the distance between the edge foci and the edges. This detector is repeatable, provides uniformity of spatial distribution, and generates uniqueness in the resulting descriptors.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for detecting an interest point in an image using edges, comprising:
   computing normalized edge magnitudes and edge orientations for the image using a processor to form a normalized gradient image;
   dividing the normalized gradient image into a plurality of image orientation maps having edge orientations;
   applying orientation dependent filtering to the image orientation maps to form response images;
   summing the response images to obtain an aggregated filter response image;
   identifying maxima in spatial position and scale in the aggregated filter response image; and
   defining maxima in the aggregated filter response as interest points.

2. The method as in claim 1, wherein forming a normalized gradient image further comprises normalizing edge magnitude by computing the average gradient in a local spatial neighborhoods for pixels in the image.

3. The method as in claim 1, wherein defining maxima further comprises identifying pixels with an intensity above a defined threshold.

4. The method as in claim 1, wherein maxima are identified in proximity to edge foci to detect interest points based on the aggregated filter responses near the edge foci.

5. The method as in claim 1, further comprising applying the orientation dependent filtering using linearly separable filters.

6. The methods as in claim 1, wherein dividing the normalized gradient image into a plurality of image orientation maps further comprises dividing edge magnitude of pixels into separate image orientation maps based on a gradient orientation of pixels and on a linear interpolation between at least two image orientation maps with a relevant orientation for the pixels.

7. The method as in claim 1, further comprising applying orientation dependent filtering to image orientation maps at multiple scales and aggregating filter responses at multiple scales to provide interest points at multiple scales.

8. A method for detecting an interest point in an image using edges, comprising:
   computing normalized edge magnitudes and orientations for the image to form a normalized gradient image;
   applying image filters to the normalized gradient image to form filter response images;
   identifying maxima having spatial position and scale in aggregated filter response images; and
   defining maxima in the image as an interest point.

9. The method as in claim 8, wherein applying image filters further comprises applying orientation dependent filters, wherein an orientation dependent filter corresponds to orientations of image orientation maps derived from the normalized gradient image.

10. The method as in claim 9, wherein applying orientation dependent filters further comprises applying a series of linear filters on the image orientation maps.

11. The method as in claim 9, wherein applying orientation dependent filters further comprises applying a Laplacian filter parallel to a normalized edge to determine the normalized edge's scale.

12. The method as in claim 11, further comprising applying a series of Gaussian filters to edges of predicted positions of edge foci on a side perpendicular to the edges.

13. The method as in claim 12, further comprising summing together responses for the Gaussian filter for edges to obtain a filter response.

14. The method as in claim 11, further comprising applying the Gaussian filter perpendicular to the edges to reinforce the filter response for edge foci.

15. The method as in claim 11, wherein the Gaussian filter is a summation of two Gaussian filters centered at $-\sigma$ and $\sigma$.

16. The method as in claim 8, further comprising applying orientation dependent filters to a plurality of image orientation maps using linearly separable filters.

17. The method as in claim 8, wherein a pixel in the image is a local maxima if the pixel's intensity response is higher than a response threshold as compared to pixel neighbors in a 3×3×3 neighborhood as identified using a 3D (three dimensional) quadratic function.

18. A system for detecting an interest point in an image using edges, comprising:
   a memory device for storing the image;
   an normalization module to compute locally normalized edge magnitudes and orientations for the image using a processor to form a normalized gradient image;
   a plurality of image orientation bins representing edge orientations into which the normalized gradient image is divided to create image orientation maps;
   an orientation dependent filtering module to apply orientation dependent filters to the image orientation maps to form response images using a processor;
   a summation module to sum the response images in order to obtain an aggregated filter response image; and
   an interest point identification module to identify local maxima in the aggregated filter response image in spatial position.

19. The system as in claim 18, further comprising applying the orientation dependent filters to orientation image maps using parallel processing units.

20. The system as in claim 18, wherein the interest point identification module is configured to apply orientation dependent filtering to image orientation maps at multiple scales and aggregating the responses at multiple scales to identify interest points at multiple scales.

* * * * *